(12) United States Patent
Kondo

(10) Patent No.: US 8,213,742 B2
(45) Date of Patent: Jul. 3, 2012

(54) IMAGE READING APPARATUS

(75) Inventor: Tomonori Kondo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1062 days.

(21) Appl. No.: 12/068,414

(22) Filed: Feb. 6, 2008

(65) Prior Publication Data

US 2008/0187242 A1 Aug. 7, 2008

(30) Foreign Application Priority Data

Feb. 7, 2007 (JP) ................................ 2007-028429

(51) Int. Cl.
*G06K 9/36* (2006.01)
(52) U.S. Cl. ......... 382/284; 382/285; 382/286; 382/289
(58) Field of Classification Search .................. 382/284, 382/285, 289
See application file for complete search history.

(56) References Cited

U.S. PATENT DOCUMENTS

| | | | | | |
|---|---|---|---|---|---|
| 4,505,575 | A | * | 3/1985 | Palumbo | 399/189 |
| 5,724,073 | A | * | 3/1998 | Hino et al. | 345/441 |
| 5,790,262 | A | * | 8/1998 | Kanno | 358/296 |
| 5,794,258 | A | * | 8/1998 | Ishikawa et al. | 715/210 |
| 5,818,415 | A | * | 10/1998 | Shirakawa | 345/442 |
| 5,841,437 | A | * | 11/1998 | Fishkin et al. | 345/619 |
| 5,970,183 | A | * | 10/1999 | Amemiya et al. | 382/282 |
| 6,181,432 | B1 | * | 1/2001 | Furuya | 358/1.11 |
| 6,191,405 | B1 | * | 2/2001 | Mishima et al. | 250/208.1 |
| 6,323,876 | B1 | * | 11/2001 | Rao et al. | 345/634 |
| 6,433,896 | B1 | * | 8/2002 | Ueda et al. | 358/488 |
| 6,466,340 | B1 | * | 10/2002 | Washio | 358/488 |
| 6,621,932 | B2 | * | 9/2003 | Hagai et al. | 382/233 |
| 6,909,801 | B2 | * | 6/2005 | Wenzel et al. | 382/152 |
| 7,027,666 | B2 | * | 4/2006 | Rudak et al. | 382/289 |
| 7,327,881 | B2 | * | 2/2008 | Okubo | 382/180 |
| 7,406,214 | B2 | * | 7/2008 | Rhoads et al. | 382/289 |
| 8,068,694 | B2 | * | 11/2011 | Zhang et al. | 382/284 |
| 2006/0007505 | A1 | * | 1/2006 | Chelvayohan et al. | 358/464 |
| 2006/0187477 | A1 | * | 8/2006 | Maki et al. | 358/1.9 |
| 2007/0133877 | A1 | * | 6/2007 | Wang et al. | 382/187 |

FOREIGN PATENT DOCUMENTS

| | | |
|---|---|---|
| JP | 09-191390 | 7/1997 |
| JP | 11-041450 A | 2/1999 |
| JP | 2004-274198 | 9/2004 |

* cited by examiner

*Primary Examiner* — Michelle Entezari
(74) *Attorney, Agent, or Firm* — Rabin & Berdo, P.C.

(57) ABSTRACT

An image reading apparatus to read image of rectangle shape document set on a setting board, is supplied capable of assigning correct edge image to an output image. In the image reading apparatus, a image data storing section stores image data reading area lager than the rectangle shape document; an edge feature extracting section extracts edge feature according to the image data; a rectangle feature extracting section extracts edge feature of side regions respectively corresponding to each side of the rectangle shape document according to the edge feature; a region selecting section selects two regions from the side regions; a coordinates calculating section calculates coordinates specifying position of straight lines representing four sides through using inclination information of the selected respective two regions; and a compounded-image outputting section replaces the feature region with frame image according to the coordinates, compounds the frame image with image data, and outputs the compounded image.

16 Claims, 17 Drawing Sheets

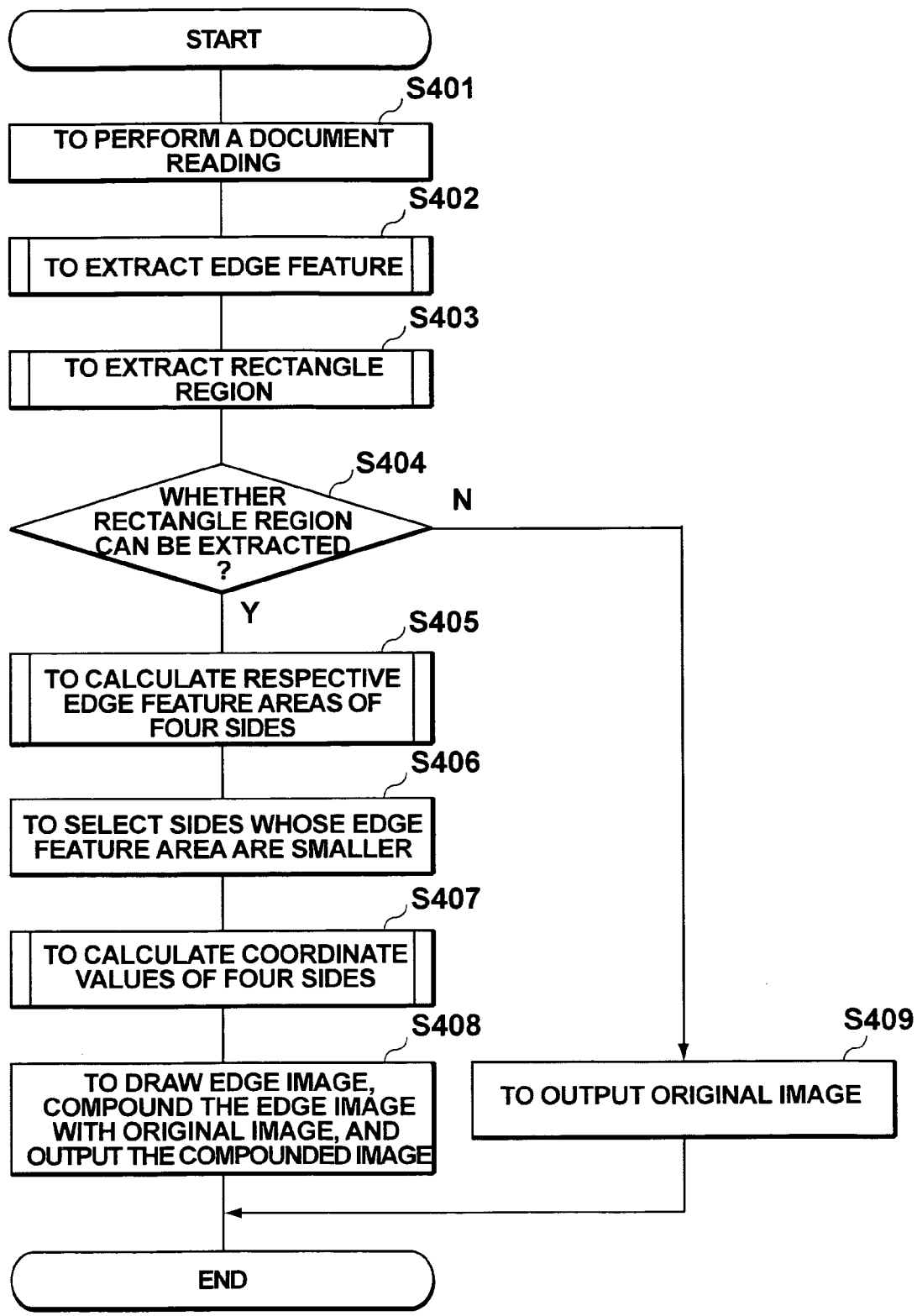

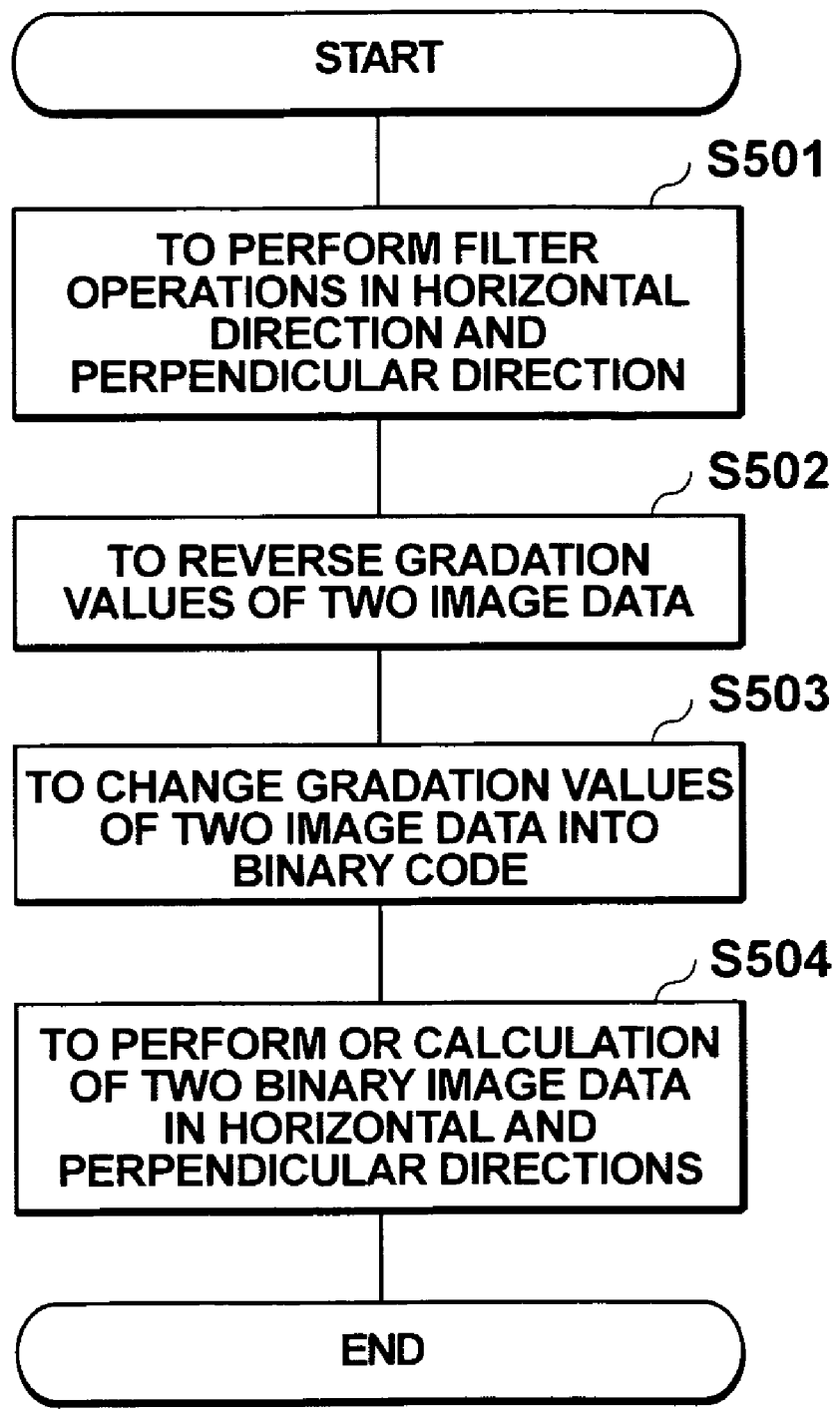

FIG.6A

EDGE FEATURE EXTRACTION OPERATOR
IN HORIZONTAL DIRECTION

| -1 | -2 | -1 |
|----|----|----|
| 0  | 0  | 0  |
| 1  | 2  | 1  |

FIG.6B

EDGE FEATURE EXTRACTION OPERATOR
IN PERPENDICULAR DIRECTION

| -1 | 0 | 1 |
|----|---|---|
| -2 | 0 | 2 |
| -1 | 0 | 1 |

IMAGE READING APPARATUS

BACKGROUND OF THE INVENTION

1. Field of the Invention

The invention relates to an image reading apparatus for reading an image of a document set on a setting board.

2. Related Background Art

In general, in this kind of apparatus, a document is set on the upside surface of a transparent setting board, and the document and the setting board is covered by a setting board cover, then light is emitted under the setting board toward the downside surface of the setting board, further the light is reflected by the setting board cover and the document and is received by a light receiving element which is installed under the setting board. Continuously, reflection light signals generated from the reflected light received by the light receiving element are converted into digital signals, and image data is obtained. In the case, in order to eliminate noise data caused by shadow around the document from the image data, with respect to the document region recognized as a rectangle, the image data without containing edge data is outputted (refer to patent document 1).

Patent document 1: Japan patent publication 2004-274198.

However, in the conventional image reading apparatus stated above, because the image data without containing edge data is outputted, there is a problem to be solved. That is, for example, in the case to print image data of a business card and the like on a paper bigger than the document (e.g. business card), when cutting off the bigger paper on which only an image without edge line is printed, it is difficult to correctly judge the edge of the business card.

SUMMARY OF THE INVENTION

It is, therefore, an object of the invention to provide an image reading apparatus capable of solving the above problem.

According to the present invention, there is provided an image reading apparatus to read an image of document, comprising a storing section for storing image data obtained by reading area lager than the document; an outline information extracting section for extracting outline information of the document according to the image data stored in the storing section; and a compounded-image outputting section for forming outline image of the document according to the outline information extracted by the outline information extracting section, compounding the outline image with the image data, and outputting the compounded image.

Moreover, the image reading apparatus may comprise a storing section for storing the image data; a rectangle information extracting section for extracting four sides-outline information corresponding to four sides of the rectangle shape document from the outline information extracted by the outline information extracting section; a region selecting section for selecting outline information of two sides having intersection from the four sides-outline information; a coordinates calculating section for calculating coordinates to specify position of straight lines representing the four sides through using respective inclination information in outline information of the selected two sides; wherein a compounded-image outputting section replaces straight lines representing the four sides with frame image according to the coordinates calculated by the coordinates calculating section, compounds the frame image with the image, and outputs the compounded image.

Moreover, the image reading apparatus may comprise a storing section for storing the image data; a rectangle information extracting section for extracting four sides-outline information corresponding to four sides of the rectangle shape document from the outline information extracted by the outline information extracting section; a region selecting section for selecting outline information of two sides having intersection from the four sides-outline information; a coordinates calculating section for calculating coordinates to specify position of straight lines representing the four sides through using respective inclination information in outline information of the selected two sides; a region managing section for storing the four sides-outline information and the coordinates, and managing frame information of plural rectangle shape documents; and wherein the compounded-image outputting section corrects inclination of the compounded image according to the frame information of the rectangle shape document as an inclination correcting section, and outputs the corrected image.

Moreover, the image reading apparatus may comprise an unit feature area calculating section for calculating edge feature areas corresponding to respective unit lengths standardized per side; wherein the region selecting section respectively selects one side whose edge feature area calculated by the unit feature area calculating section is smaller from two groups of the two sides having intersection; and wherein the coordinates calculating section calculates coordinates specifying position of straight lines representing the four sides through using inclination information of the sides whose edge feature area selected by the region selecting section is smaller.

EFFECT OF THE PRESENT INVENTION

According to the present invention, because positions of straight lines representing four sides of edge image are specified by the coordinates calculating section, the edge image is correctly found according to coordinates calculated by the coordinates calculating section and is composed with an original image, further composite image is outputted, for example, even if a business card and the like is printed on a paper bigger than the document (i.e. business card), when cutting off the bigger paper, it is possible to correctly judge the edges of the business card.

The above and other objects and features of the present invention will become apparent from the following detailed description and the appended claims with reference to the accompanying drawings.

BRIEF DESCRIPTION OF THE DRAWINGS

FIG. 4 is a flowchart for explaining the whole operation of an image reading apparatus in embodiment 1;

FIG. 5 is a flowchart for explaining operation of an edge feature extracting section;

FIG. 6A is an explanatory diagram of an example of horizontal direction feature extracting operation;

FIG. 6B is an explanatory diagram of an example of perpendicular direction feature extracting operation;

DETAILED DESCRIPTION OF THE PREFERRED EMBODIMENTS

Embodiments of the invention will be described in detail hereinbelow with reference to the drawings.

Embodiment 1

Explain of the Construction

Figure 1:
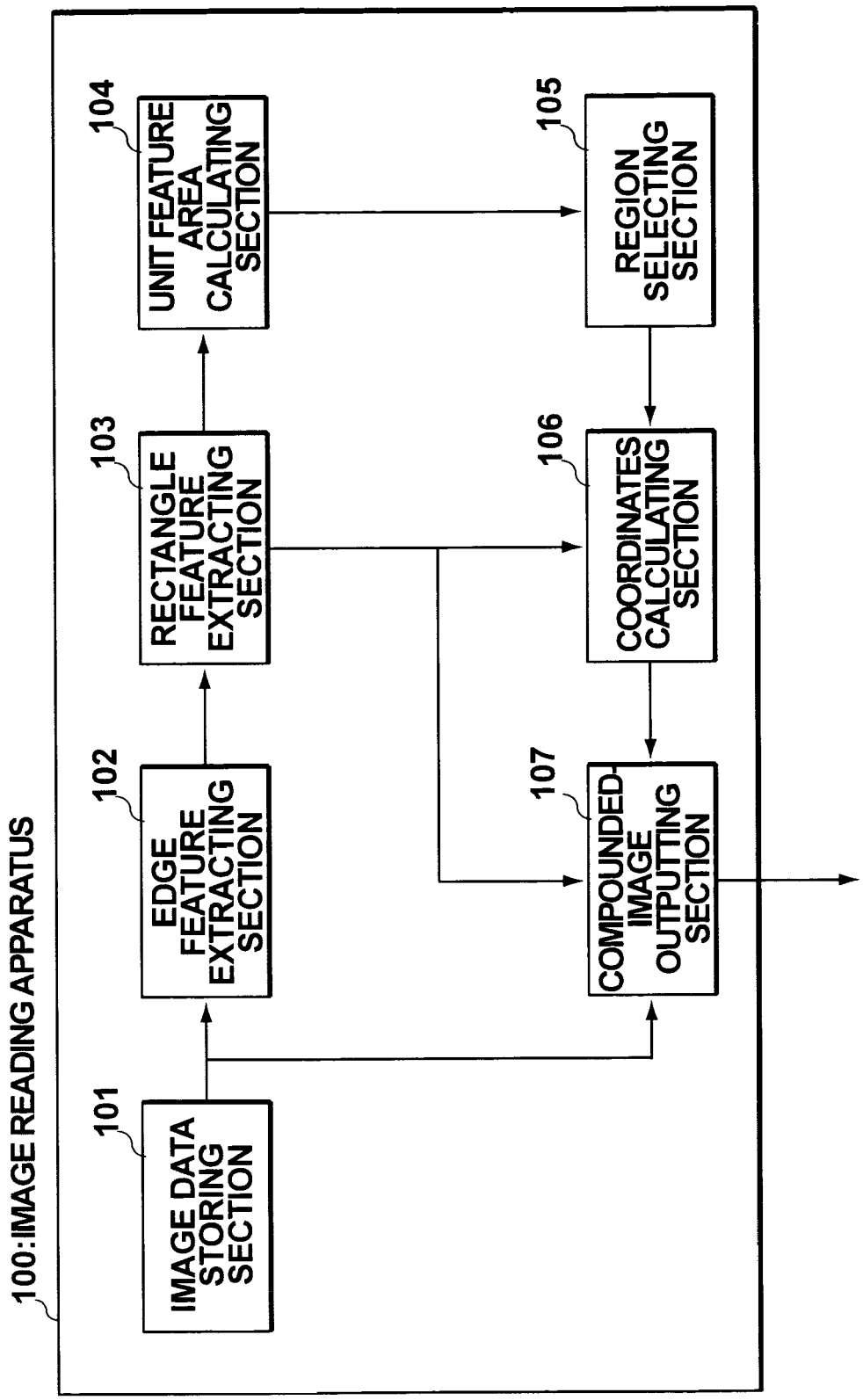
FIG. 1 is a function block diagram of an image reading apparatus in embodiment 1.

FIG. 1 is a function block diagram of an image reading apparatus in embodiment 1.

As shown in the diagram, an image reading apparatus 100 in the embodiment 1 comprises an image data storing section 101, an edge feature extracting section 102 (i.e. outline information extracting section), a rectangle feature extracting section 103 (i.e. rectangle information extracting section), a unit feature area calculating section 104, a region selecting section 105, a coordinates calculating section 106, and a compounded-image outputting section 107. Appearance and inside construction of the image forming apparatus 100 will be explained prior to detail description of respective function parts.

Figure 2:
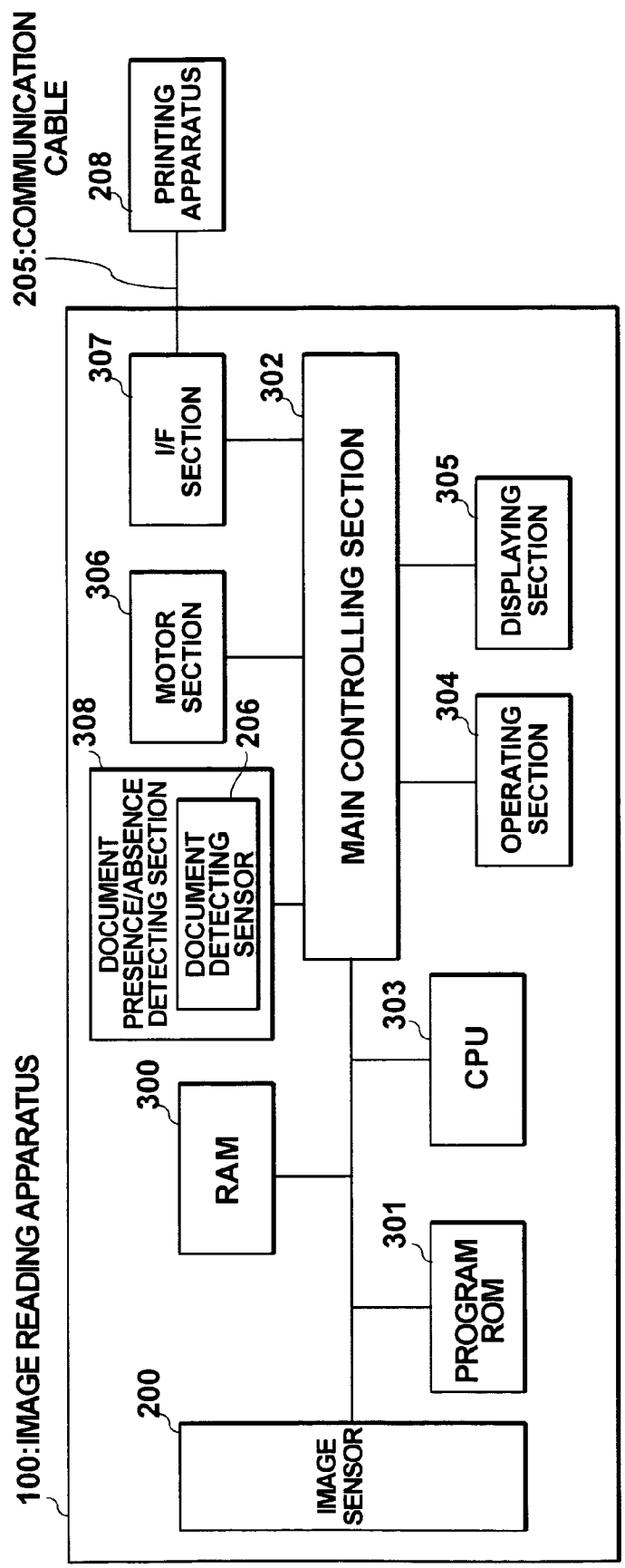
FIG. 2 is an inside construction diagram of an image reading apparatus.
Figure 3:
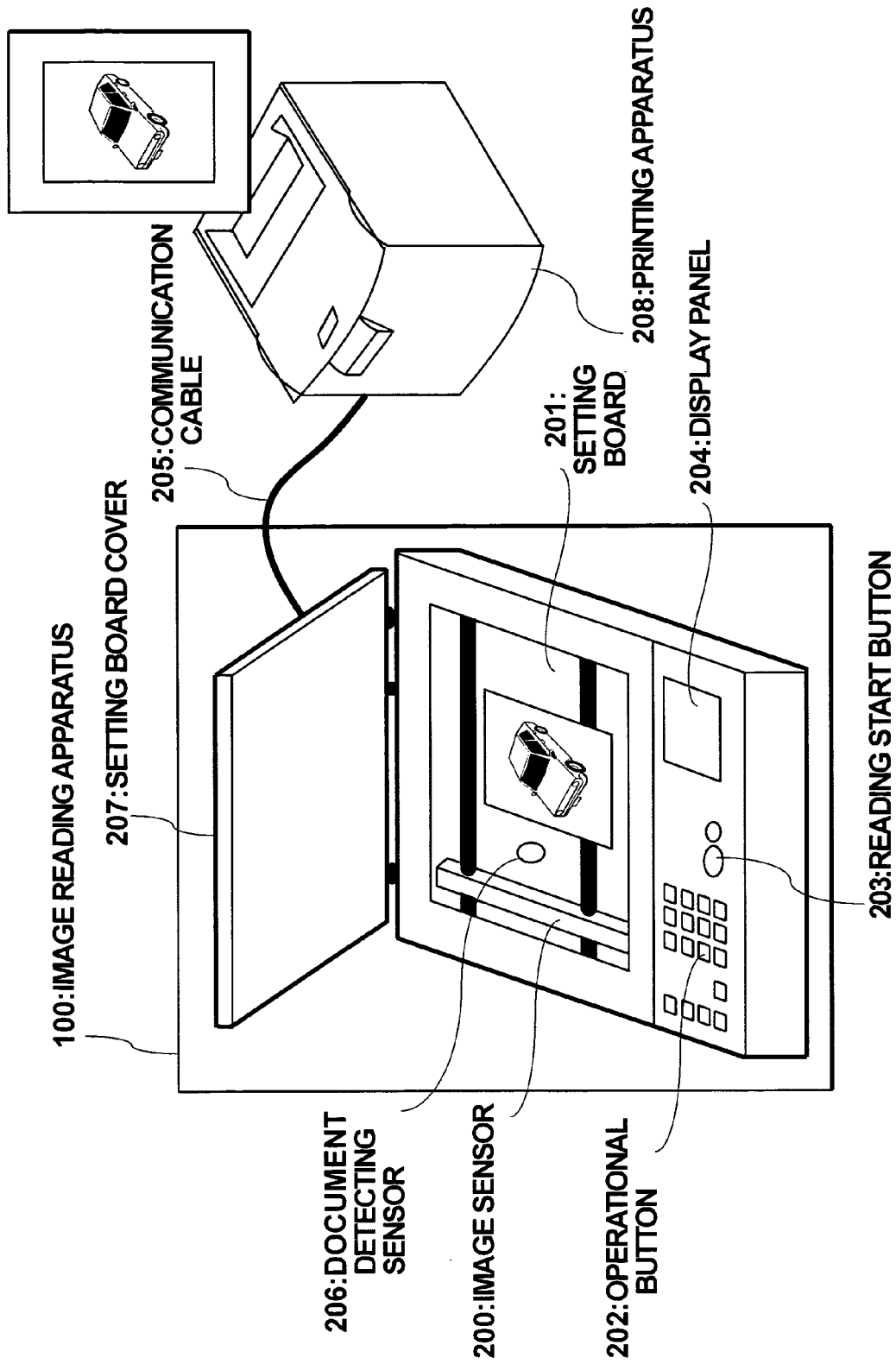
FIG. 3 is an appearance construction diagram of an image reading apparatus.

FIG. 2 is an inside construction diagram of an image reading apparatus; and FIG. 3 is an appearance construction diagram of an image reading apparatus.

In the FIG. 3, it shows the case that an image data obtained by reading rectangle document through the image reading apparatus 100 is printed on a paper whose size is bigger than the document by a printing apparatus 208. A edge line showing a border between the rectangle document and a region except the rectangle document is printed on the paper. Moreover, in the FIG. 3, in order to explain the present invention, the surface to be read of the document is set on the opposite side with respect to the setting board 201, in fact, the surface of the document should be set to face to the setting board 201. Next, a construction of the image reading apparatus 100 in embodiment 1 will be explained by mainly using the FIG. 2 together with the FIG. 3.

As shown by the FIG. 2, the image reading apparatus 100 comprises an image sensor 200, a RAM 300, a program ROM 301, a main controlling section 302, a CPU 303, an operating section 304, a display section 305, a motor section 306, an I/F section 307, and a document presence/absence detecting section 308.

The image sensor 200 is a part to obtain an image data by converting document data of a document set on the setting board 201 (as shown by FIG. 3) into electric signals and scanning area larger than the document. In the case, it is possible to adopt various known methods as methods to scan document by using the image sensor 200 and read image data. For example, as the method of reading document, it may use such method to move a contact type line image sensor or a CCD image sensor, which is known and is applied in a fixedly putted reading apparatus.

The RAM 300 is a volatility memory constructed as having a capacity capable of at least storing one page of image data obtained by the image sensor 200. The program ROM 301 is an exclusive memory for reading to store various control program for an image reading control of the image sensor 200, a reading/writing control relative to the RAM 300, and the like.

The main controlling section 302 is a part which is started/generated by that the CPU 303 executes program stored in the program ROM 301 and controls the whole image reading apparatus 100. The CPU 303 is a microprocessor to start/generate the main control section 302 by executing a predetermined program stored in the program ROM 301.

The operating section 304 consists of an operational button 202 (FIG. 3) such as ten keys and a reading start button 203 (FIG. 3). The operating section 304 is a part to perform an action of man-machine interface (information inputting) which is able to perform a start/stop of reading operation and a setting of reading information.

The displaying section 305 consists of a display panel 204 (FIG. 3) like a liquid crystal. The displaying section 305 is a part to perform an action of man-machine interface (information outputting) which is able to display situation and all kinds of information of the image reading apparatus 100. The motor section 306 is a part to generate driving power used for moving the image sensor 200 when reading the document based on the control of the main controlling section 302.

The I/F section 307 is an interface used in connection of the image reading apparatus 100 and an external equipment such as the printing apparatus 208 via a communication cable 205. By the I/F section 307, the image data is transmitted to the external equipment. General interface such as USB, IEEE1394, Ethernet (registered trademark), wireless LAN and the like can be adopted as the I/F section 307. In the case to communicate with the external equipment over the radio, the communication cable 205 is unnecessary. The outside equipment is not limited to the printing apparatus 208, and any kind of equipment will do, as long as it deals with image data such as information equipment like a personal computer, or storing apparatus like a hard disk apparatus.

The document presence/absence detecting section 308 has a document detecting sensor 206 (FIG. 3) which detects that the document is being set on the setting board 201. The document presence/absence detecting section 308 is also a part to inform the main control section 302 whether the document is present or absent. Here, regarding the document detecting sensor 206, any kind of sensor will do, if only it can detect a presence of the document. Further, regarding a detecting method of the document, for example, it may be realized by pressing a mechanical switch through a weight of the document, when the document is set over the sensor; it may be realized by using element of light reflection type, when the document is set over the sensor; it may be realized by making the document block light, when the document is set over the sensor. Moreover, respective parts stated above are connected each other via bus not shown in the drawings.

The setting board 201 (FIG. 3) is a flat board for setting the document. Generally, glass board is used. However, instead of the glass board if only it is transparent without influence for reading quality and it has predetermined strength, any kind of board can be used.

The image reading apparatus 100 further comprises a setting board cover 207. The setting board cover 207 (FIG. 3) is a part that covers up the setting board in order to block environmental light from the outside, when the image sensor 200 reads the document.

The image reading apparatus 100 comprising the compositions explained above performs respective functions shown in FIG. 1. Next, returning to FIG. 1, respective function blocks will be explained in detail below.

The image data storing section 101 is a part that stores image data read out from an area larger than the document by the image sensor 200 (FIG. 2) into the RAM 300 (FIG. 2); and outputs the stored image data to the edge feature extracting section 102 and the compounded-image outputting section 107.

The edge feature extracting section 102 is a part that extracts edge feature data from the image data stored in the image data storing section 101; and outputs the extracted edge feature data to the rectangle feature extracting section 103. Here, the edge feature data represents the edge (i.e. boundary) of an image and including not only straight lines but also many segments whose shape are not unspecified.

The rectangle feature extracting section 103 is a part that extracts a region surrounded by four sides representing a rectangle, as a rectangle region, from the edge feature data extracted by the edge feature extracting section 102; and outputs data representing the extracted rectangle region to the unit feature area calculating section 104, the coordinates calculating section 106 and the composite image output section 107.

The unit feature area calculating section 104 is a part that calculates edge feature areas corresponding to respective unit lengths (e.g. 1 cm) standardized per side to form the rectangle region extracted by the rectangle feature extracting section 103; and outputs the calculated four edge feature areas to the region selecting section 105.

The region selecting section 105 is a part that combines two sides that are facing to and are paralleling each other so as to obtain two groups with respect to the four sides representing the rectangle; selects one side whose edge feature area is smaller in corresponding group; and outputs region information representing two sides from respectively selected the two groups to the coordinates calculating section 106.

The coordinates calculating section 106 is a part that generates a rectangle shape as edge straight line of the document from the region information of the two sides selected by the region selecting section 105; calculates coordinates of region of the rectangle shape; and outputs vector information of the calculated coordinates of the rectangle region shape to the composite image output section 107.

The composite image output section 107 is a part that paints out the rectangle region with a background color, extracted by the rectangle feature extracting section 103 from the original image data stored in the image data storing section 101; draws edge image according to the vector information of the rectangle region shape calculated by the coordinates calculating section 106; compounds the edge image with image data; and outputs the compounded image. As the edge image, any kind of line may be used, for example, solid line, broken line and the like, further, the width of the line also may be set freely. Furthermore, it is possible to mark four corners of the document by using cross line and the like without drawing the edge.

Each function block explained above by using the FIG. 1 is stored in the program ROM 301 as control program; is temporarily read into the RAM 300 when it is executed; and is started/generated as a function of the main controlling section 302 through the CPU 303 executes it.

Explain of the Operation

FIG. 4 is a flowchart for explaining the whole operation of an image reading apparatus in embodiment 1.

As an order of operation explain, first, the summary operation of the image reading apparatus will be explained, next, an important flow in the whole operation will be explained in detail. The whole operation of the image reading apparatus will be explained from step S401 to step S409 according to a step order by using the FIG. 1 and the FIG. 2 together with the FIG. 3.

Step S401:

The image reading apparatus 100 reads an area larger than the document by scanning through the image sensor 200; obtains image data; and stores it into the image data storing section 101.

Step S402:

The edge feature extracting section 102 extracts edge feature (i.e. outline information) from the image data stored in the image data storing section 101. Details will be explained again later by using other flowchart.

Step S403:

The rectangle feature extracting section 103 extracts rectangle region from the edge feature extracted by the edge feature extracting section 102. Details will be explained again later by using other flowchart.

Step S404:

In the above step S403, if the rectangle region can be extracted, the step S405 is started; if the rectangle region cannot be extracted, the step S409 is started.

Step S405:

The unit feature area calculating section 104 calculates each edge feature area of four sides forming the region from the rectangle region extracted in the step S403. Details will be explained again later by using other flowchart.

Step S406:

The region selecting section 105 combines two sides that are facing and are paralleling each other in the four sides representing a rectangle; and selects one side whose edge feature area is smaller with respect to each group.

Step S407:

The coordinates calculating section 106 generates rectangle shape as edge of the document from region information of the two sides selected by the region selecting section 105; and calculates coordinates value of the edge of the document. Details will be explained again later by using other flowchart.

Step S408:

The compounded-image outputting section 107 draws edge image according to the vector information of the rectangle region shape calculated by the coordinates calculating section 106; compounds the edge image with original image stored in the image data storing section 101; and outputs the compounded image.

Step S409:

The compounded-image outputting section 107 outputs the original image stored in the image data storing section 101 just as it is.

Next, an important flow in the whole operation will be explained in detail according to theory.

FIG. 5 is a flowchart for explaining operation of an edge feature extracting section.

The flowchart is to explain the above step S402 in detail.

The operation of the edge feature extracting section 102 (FIG. 1) will be explained in detail from step S501 to step S504 according to a step order. Here, regarding the edge, it is a part to become boundary of image, in the following flow, not only straight line but also the boundary part of image will be emphasized.

Step S501:

Regarding filter operation to make feature of the edge noticeable with respect to original image data, it will be explained. The following is to explain a filter which is used when extracting feature in the present invention; and whose size is 3×3.

FIG. 6A and FIG. 6B are explanatory diagrams of edge feature extraction operator.

FIG. 6A is showing edge feature extraction operator in horizontal direction; and FIG. 6B is showing edge feature extraction operator in perpendicular direction.

Regarding operator, as shown in the diagrams, a filter is used whose size is 3×3. In filter operation, target pixel and 8 pixels in circumference of the target pixel are assigned weight factor values (−1, −2, . . . ), and a liner calculation is performed by using the weight factor values, then the gradation value of the target pixel is replaced with a calculation value. The filter operation is performed with respect to the whole image. After performed the step, two image data are obtained. One is an image data whose edge feature in horizontal direction is noticeable, another is an image data whose edge feature in perpendicular direction is noticeable. In the case, a well-known Sobel differentiation and the like are used. Next is to return to FIG. 5 for explaining the operation.

Step S502:

The gradation values of the two image data obtained in the above step S501 are reversed. That is, since black and white of the image are reversed by the process of the step S501, the gradation values of the image data is subtracted from the maximum gradation value.

Step S503:

The gradation values of the two image data obtained in the above step S502 are changed into binary code according to a predetermined threshold value. The threshold value is previously set to a most suitable value. And it may be available to make histogram by using the image data, and to change the gradation values of the image data into binary code according to the histogram. In the step, rectangle features in horizontal and perpendicular directions can be obtained as binary image data.

Step S504:

With respect to the two binary image data obtained in the above step S503, logic OR calculation is performed.

Figure 7:
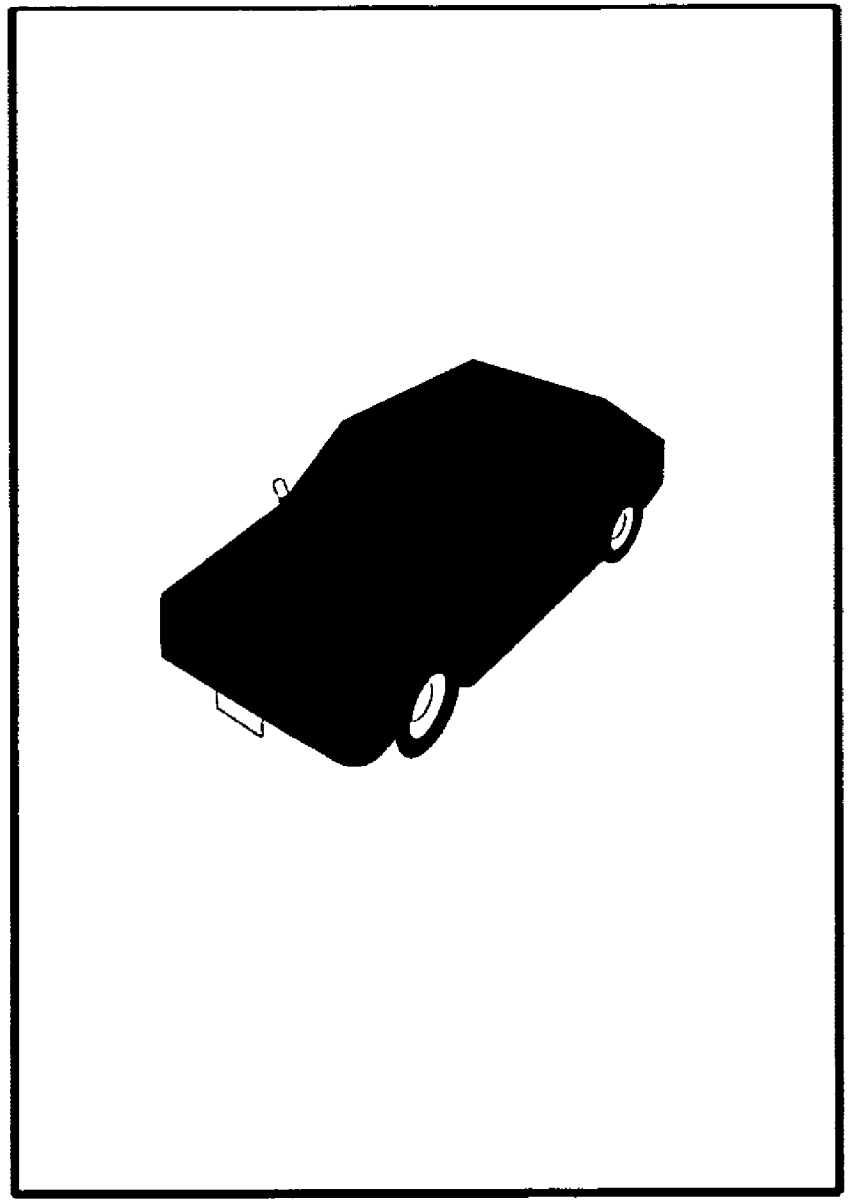
FIG. 7 is an explanatory diagram of an edge feature.

FIG. 7 is an explanatory diagram of an edge feature.

As shown by FIG. 7, as a result of the logic OR calculation, an image is obtained whose edge color is black. In the image, the edge of the document is represented with straight lines, and a car image is displayed with black pixels.

Figure 8:
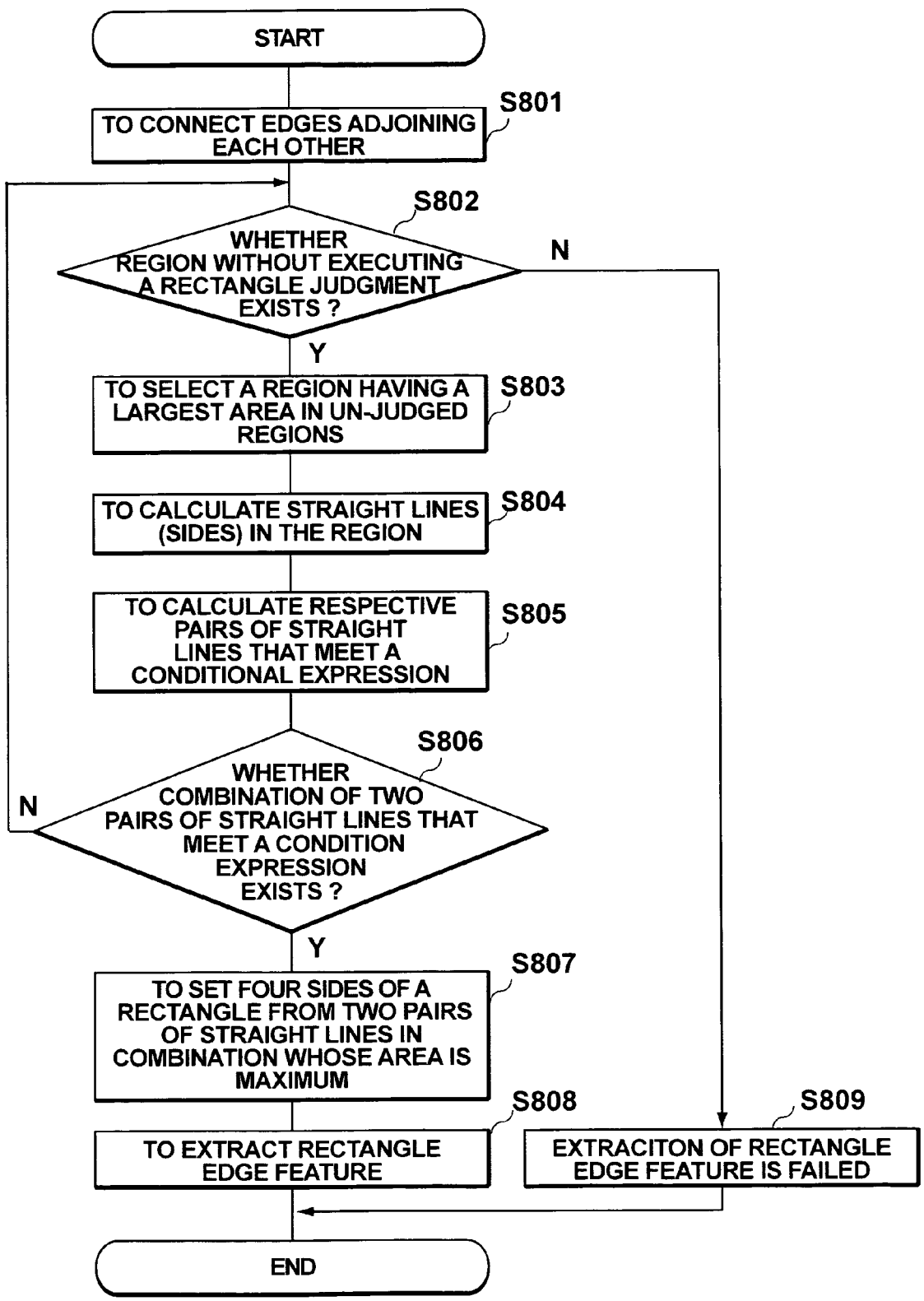
FIG. 8 is a flowchart for explaining operation of a rectangle feature extracting section.

FIG. 8 is a flowchart for explaining operation of a rectangle feature extracting section.

The flowchart will explain the above step S403 in detail. Operation of a rectangle feature extracting section 103 (FIG. 1) will be explained in detail from step S801 to step S804 according to a step order. Here, for example, in FIG. 7, the car image is eliminated from the image; and an edge image of the document is extracted. In the following flow, a well-known Hough transformation is used.

Step S801:

With respect to the whole region to be read, the edges adjoining each other are connected, and a rectangle region is obtained.

Step S802:

If the rectangle region without executing a rectangle judgment exists, the step S803 is started; if it not exist, the step S809 is started.

Step S803:

In the rectangle region without executing a rectangle judgment, a rectangle region having a largest area is selected. Regarding an area calculation, it is performed by respectively using the biggest point and the smallest point of x coordinates value and y coordinates value in the rectangle region.

Step S804:

Through using edge feature which forms the rectangle region selected in the step S803, plural straight lines (sides) are calculated. Here, a numerical description method of straight line will be explained.

Figure 9:
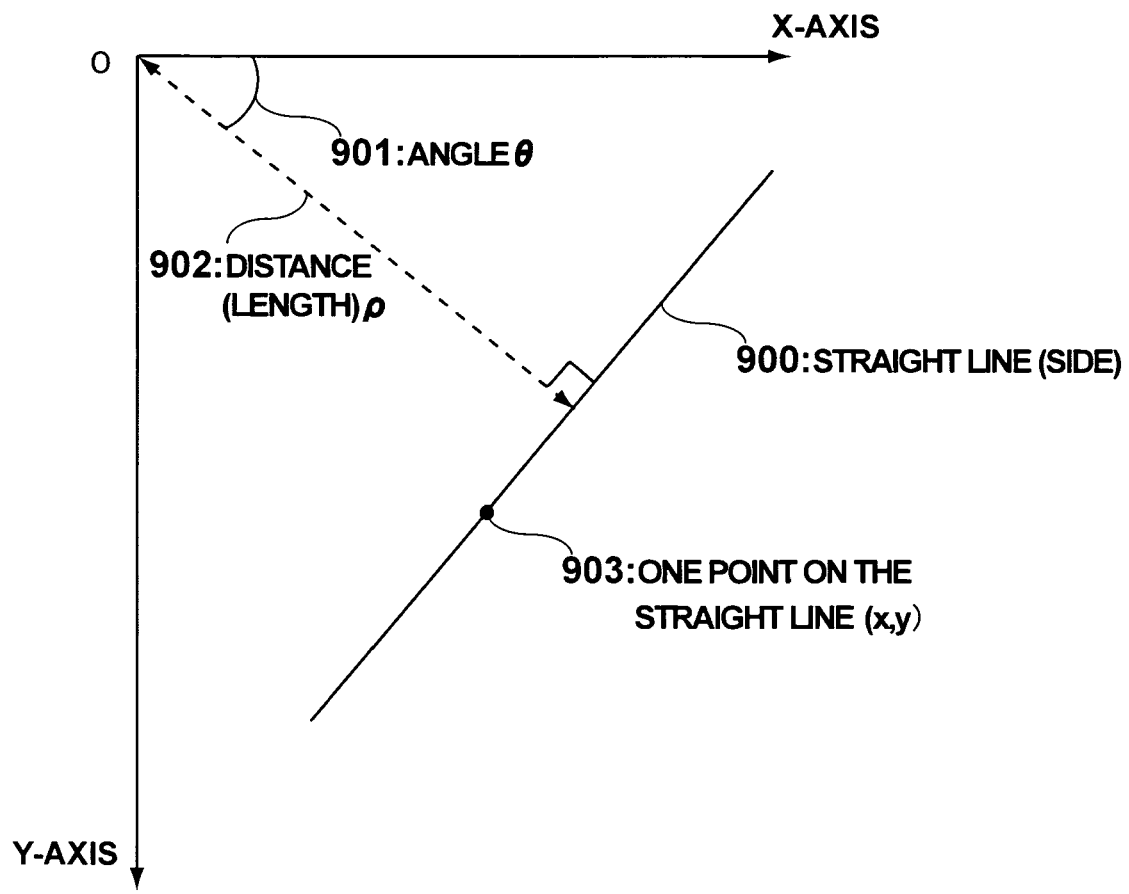
FIG. 9 is an explanatory diagram of numerical description method of straight line.

FIG. 9 is an explanatory diagram of numerical description method of straight line.

As shown by FIG. 9, a straight line (side) 900 is represented by an angle θ (901) between a perpendicular line 902 at right angles with the straight line 900 and an X-axis, and by a distance (length) ρ (902) of the perpendicular line 902. One point (x, y) 903 on the straight line is represented by the following expression.

$$\rho = x\cos\theta + y\sin\theta$$

The Hough transformation transforms the point (x, y) described with right-angled coordinates system into two-dimensional space of angle θ and distance ρ; adds the number of the points exist on the straight line 900 at regular intervals; and sets the straight line 900 represented by angle θ and distance (length) ρ that make the number of the points become maximum as a longest straight line. In the case that the intervals are taken in short distance, the calculation accuracy of the straight line rises, however, memory use quantity increases. The maximum number of straight line to be detected is set. It may be suitable to select straight line having the number of points over a predetermined number.

Step S805:

The plural straight lines having the same angle θ, which calculated in the step S804 are paired off according to the following conditional expression. In the case, it is possible to use the same straight line to pair off any number of times.

$$|\rho i - \rho j| > \delta\rho \text{ and } |\theta i - \theta j| < \delta\theta \text{ but } i \neq j$$

By the Step, two straight lines having the same angle θ and locating furthest away from each other (almost parallel) are selected.

Step S806:

In the paired straight lines calculated in the step S805, a combination of the paired straight lines and the paired straight lines that meet the following conditional expression is calculated. In the case, it is possible to use one pair to combine any number of times. Thereby two paired straight lines which are at right angles each other are calculated. If the combination of the two paired straight lines is calculated, the step S807 is started; if it is not calculated, the step S802 is started.

$$\left|\cos\left(\frac{\theta_k + \theta_i}{2} - \frac{\theta_m + \theta_n}{2}\right)\right| < \delta_0 \text{ but, } \delta_0 \text{ is close to zero.}$$

Step S807:

In the combination of the two paired straight lines calculated in the step S806, a combination whose area is maximum is selected and is set into four sides of a rectangle. Details will be explained with drawing.

Figure 10:
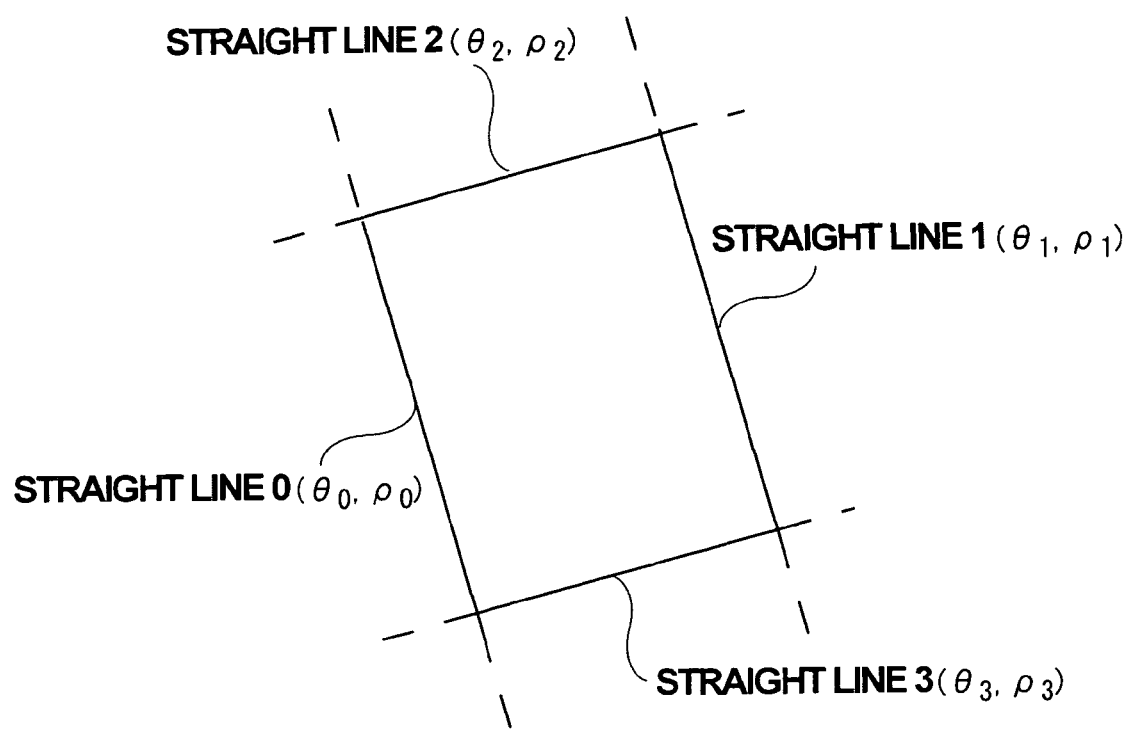
FIG. 10 is an explanatory diagram of rectangle extracting principle.

FIG. 10 is an explanatory diagram of rectangle extracting principle.

As shown by FIG. 10, four sides of a rectangle are represented with a straight line 0 (θ0, ρ0), a straight line 1 (θ1, ρ1), a straight line 2 (θ2, ρ2) and a straight line 3 (θ3, ρ3). A rectangle whose area encircled by the four side is maximum is selected.

Step S808:

Pixels forming the four sides selected in the step S807 are extracted as rectangle edge feature. Then the flow is ended.

Step S809:

In the case, it may be judged that extraction of the rectangle edge feature failed, then the flow is ended.

Figure 11:
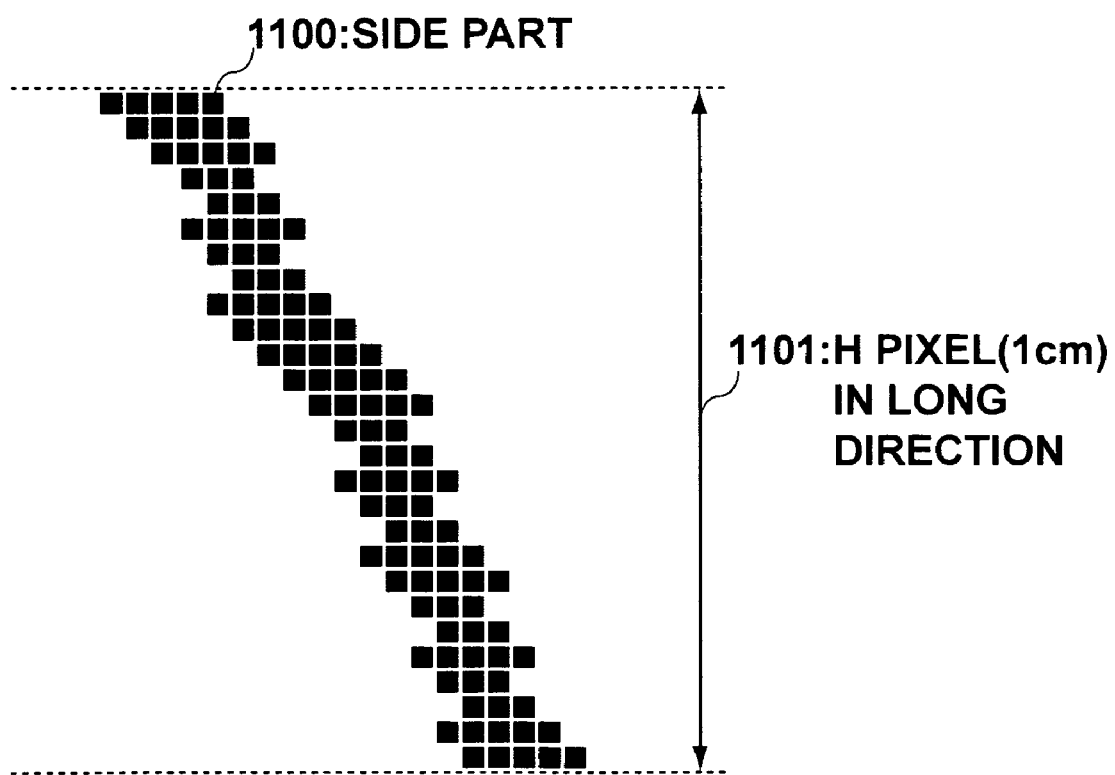
FIG. 11 is an explanatory diagram of calculating principle of edge feature area.

The drawing is to explain that unit feature area calculating section 104 calculates respective edge feature areas of four sides forming a rectangle in the step S405. In FIG. 11, only one of the four sides is shown as an example.

With respect to one side, a region of H pixel (1 cm) 1101 in long direction is cut off as a part of the side; a total number K of pixels of the side part 1100 in the cut region is counted; and an edge feature area Q is calculated according to the following expression.

$$Q = K/H$$

Regarding the remaining three sides, they are calculated in the same way.

Figure 12A:
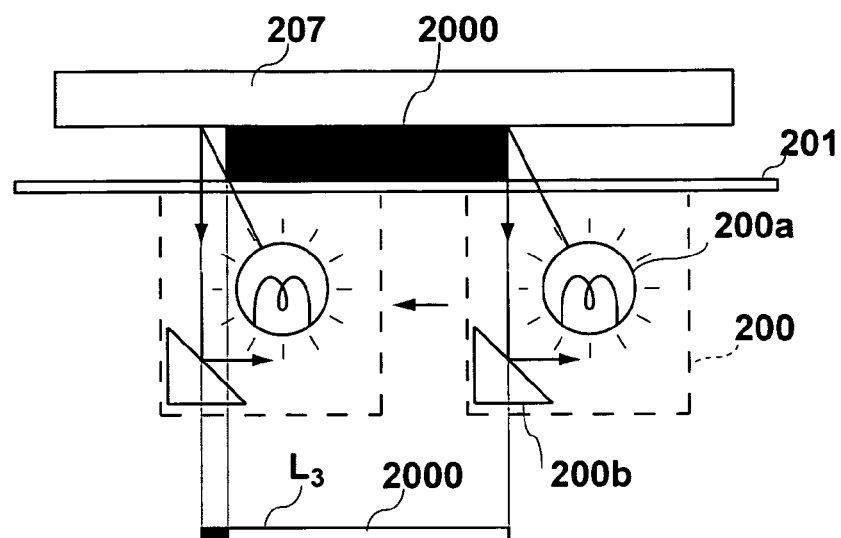
FIG. 12A is an explanatory diagram of an example of edge feature area (a side view)
Figure 12B:
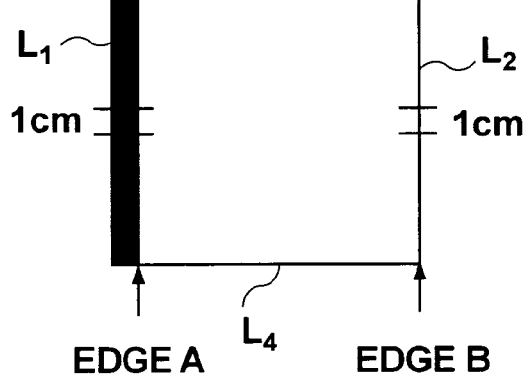
FIG. 12B is an explanatory diagram of an example of edge feature area (a plane view)

FIG. 12A is a side view to explain an example of edge feature area; and FIG. 12B is a plane view to explain an example of edge feature area. The drawings represent an example that a thick document, for example, a book 2000 or the like is set on the setting board 201, and reading operation is performed through an image sensor 200.

As shown by FIG. 12A and FIG. 12B, because the position of a light source 200a of the image sensor 200 deviates from the position of a reflector 200b, in the case to move the image sensor 200 along an arrow direction, on edge A, shadow wider than edge B happens. Because the edge A having wider shadow contains noise data and the like, the accuracy of rectangle extraction falls.

In particular, in the case that the thick document such as book 2000 and the like is slanted, the accuracy more falls. Therefore, in the step S406, in order to use the edge B in the step S407, the region selecting section 105 combines two sides $L_1$, $L_2$ that are facing to each other with two sides $L_3$, $L_4$ that are facing to each other, from the four sides representing the rectangle; and selects sides $L_2$ and $L_3$ whose edge feature areas are smaller in corresponding group, from the edge feature areas calculated by the unit feature area calculating section 104.

Figure 13:
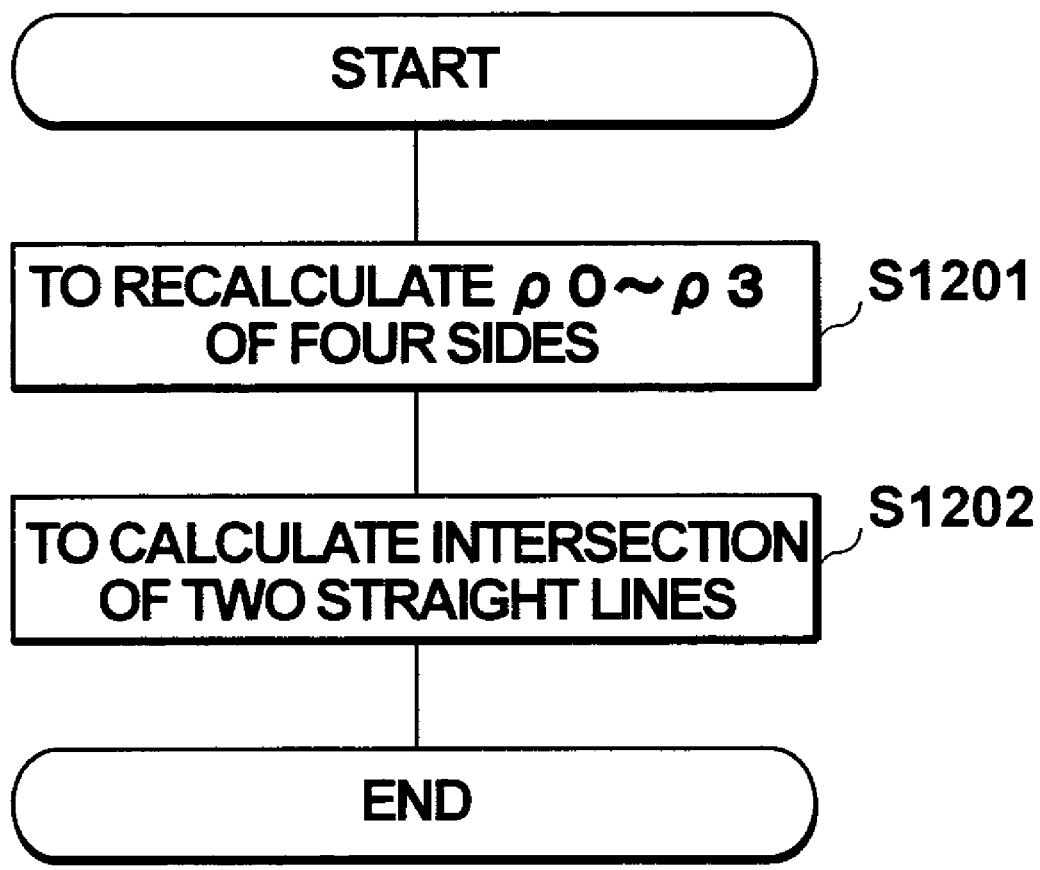
FIG. 13 is a flowchart for explaining operation of a coordinates calculating section.

FIG. 13 is a flowchart for explaining operation of a coordinates calculating section.

The drawing is a flowchart to explain that the coordinates calculating section 106 (FIG. 1) recalculates straight lines of four sides of a rectangle through using inclinations of the two sides $L_2$ and $L_3$ selected by the region selecting section 105 (FIG. 1), in step S407.

The operation of the unit feature area calculating section 104 (FIG. 1) will be explained in detail from step S1201 to step S1202 according to a step order.

Step S1201:

In the case that the inclinations of the two sides selected by the region selecting section 105 are respectively represented into θα and θβ in the step S407, four straight lines representing four sides of a rectangle are newly represented into (θα, ρ0'), (θα, ρ1'), (θβ, ρ2') and (θβ, ρ3'); ρ0~ρ3 are recalculated to find ρ0'~ρ3'.

Here, a calculating principle of coordinates calculating section will be explained.

Figure 14:
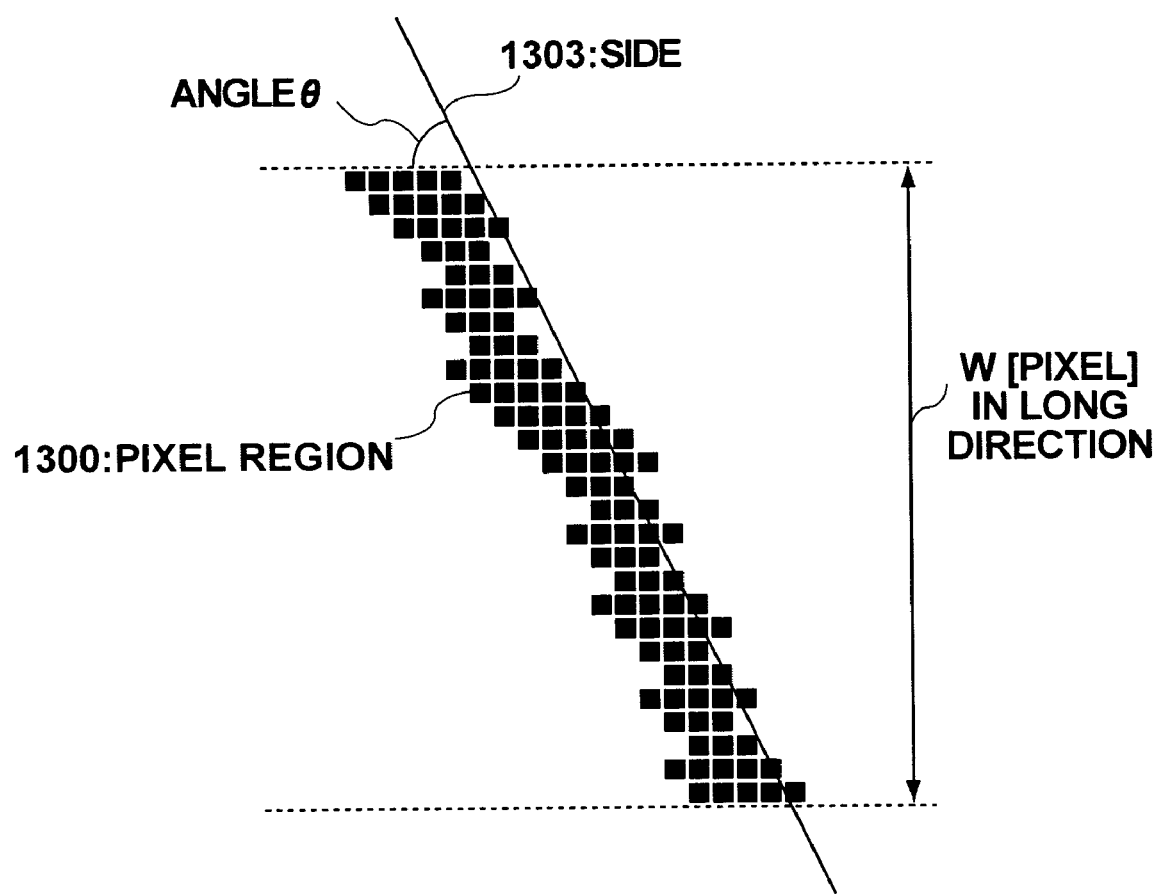
FIG. 14 is a explanatory diagram of principle of a coordinates calculating section.

FIG. 14 is a principle explanatory diagram of coordinates calculating section.

As shown by FIG. 14, a region of W [pixel] part in long direction of side 1303 is cut off from the side; and an angle θ is founded from pixels existing on the inside of an inner region of the pixel region 1300; and the side 1303 is calculated by a well-known minimum 2-multiplication. However, regarding the angle θ, when calculating ρ0' or ρ1', θα is used; and when calculating ρ2' or ρ3, θβ is used. The following is to return to flowchart of FIG. 13.

Step S1202:

Four points of corners of rectangle are founded according to the following expression, as intersections of respective two straight lines, and the flow is ended.

$$x = \frac{\rho_i \sin\theta_j - \rho_j \sin\theta_i}{\cos\theta_i \sin\theta_j - \cos\theta_j \sin\theta_i} \qquad \text{Expression 1}$$

$$y = \frac{\rho_i \cos\theta_j - \rho_j \cos\theta_i}{\cos\theta_j \sin\theta_i - \cos\theta_i \sin\theta_j} \qquad \text{Expression 2}$$

However, regarding i and j, with respect to θ, they are α or β, and with respect to ρ, they are 0~3.

Explain of the Effect

As explained above, because calculated an inclination according to two sides having few incorrect information including shadow and the like; and calculated coordinates of rectangular shape document in the step S406, it is possible to correctly obtain edge representing boundary between the rectangular shape document and region except the document.

Embodiment 2

In the embodiment, in the case to copy document which needs correct information regarding edge such as a business card and to put plural sheets of the documents on the setting board 201 (FIG. 3), it is a purpose to correct respective inclinations of the plural sheets of the documents so as to correctly judge the edges of the respective business cards when cutting off the copied paper (the business cards). An image reading apparatus in the embodiment is constructed as the following structure, in order to achieve the above purpose.

Explain of the Construction

Figure 15:
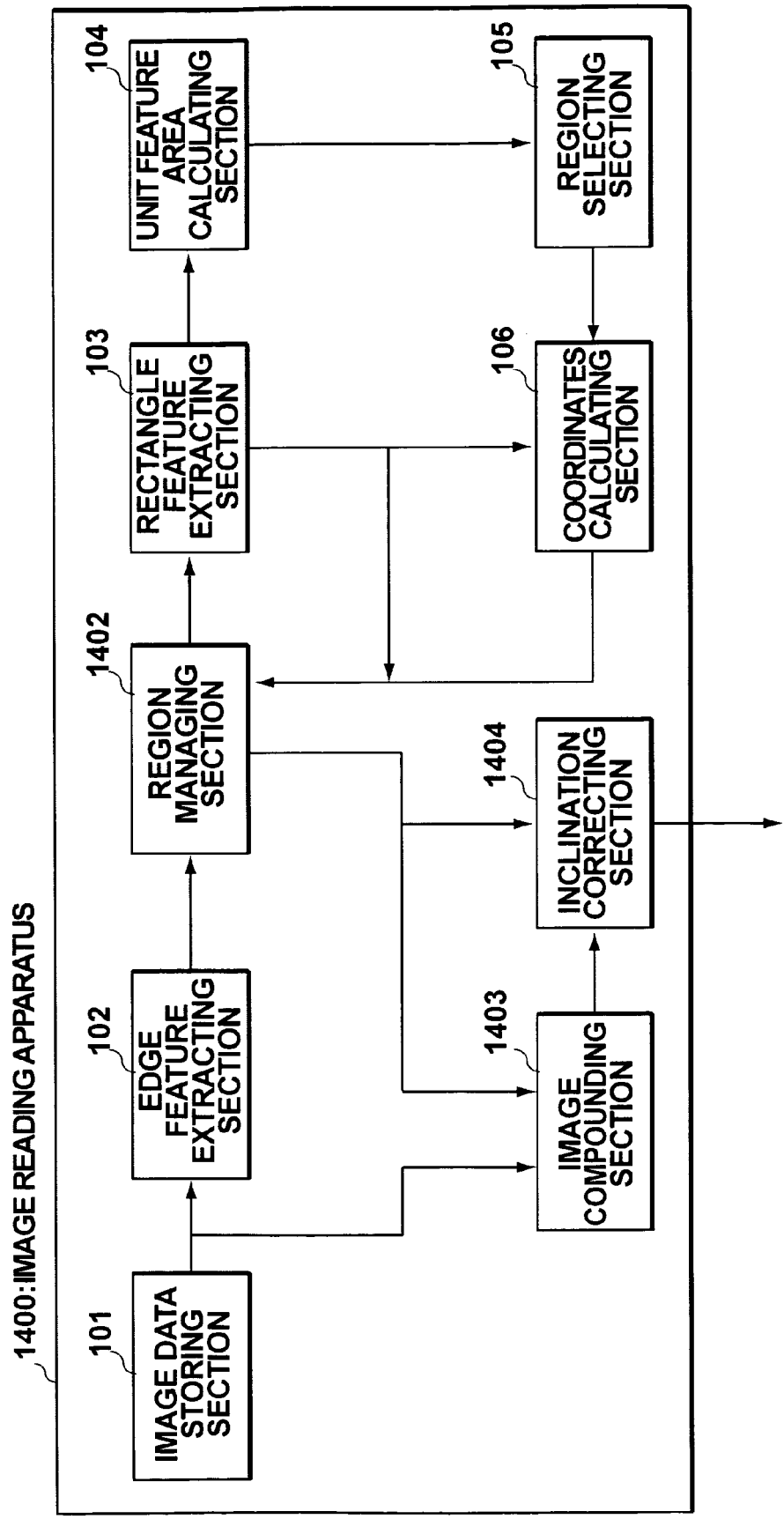
FIG. 15 is a function block diagram of an image reading apparatus in embodiment 2.

FIG. 15 is a function block diagram of an image reading apparatus in embodiment 2.

As shown by FIG. 15, an image reading apparatus 1400 in embodiment 2 comprises an image data storing section 101, an edge feature extracting section 102, a rectangle feature extracting section 103, a unit feature area calculating section 104, a region selecting section 105, a coordinates calculating section 106, a region managing section 1402, an image compounding section 1403 and an inclination correcting section 1404. The following is only to explain the part different from the embodiment 1, the same symbols are assigned and their explanations are omitted. Moreover, regarding the appearance of the image reading apparatus 1400 and its inside construction, because they are the same as the embodiment 1, their explanations are omitted; and the image reading apparatus 100 (embodiment 1) is replaced by the image reading apparatus 1400 (embodiment 2) in the following explanation.

The region managing section 1402 is a part that manages the edge feature data extracted by the edge feature extracting section 102, the rectangle region extracted by the rectangle feature extracting section 103, and vector information of edge representing boundary between the rectangular shape document and region except the document calculated by the coordinates calculating section 106; and processes plural rectangular shape region. Further, the region managing section 1402 is a part to output the edge feature data to the rectangle feature extracting section 103 until the rectangle feature extracting section 103 fails in rectangle judgment. Furthermore, the region managing section 1402 is a part to output the rectangle region extracted by the rectangle feature extracting section 103 and the vector information of the edge representing boundary between the rectangular shape document and region except the document calculated by the coordinates calculating section 106, that are managed by self, to the image compounding section 1403 and the inclination correcting section 1404 when the rectangle feature extracting section 103 fails in rectangle judgment.

The image compounding section 1403 is a part to be replaced by the compounded-image outputting section 107 (FIG. 1) in the embodiment 1. The image compounding section 1403 is also a part that paints out the rectangle region inputted and extracted by the region managing section 1402 from the original image data stored in the image data storing section 101, with a background color; draws edge image according to the vector information of the edge representing boundary between the rectangular shape document and region except the document inputted by the region managing section 1402; compounds the edge image with image data; and outputs the compounded image to the inclination correcting section 1404. As the edge image, any kind of line may be used, for example, solid line, broken line and the like, further, the width of the line also may be set freely. Furthermore, it is possible to mark four corners of the document by using cross line and the like without drawing the edge.

The inclination correcting section 1404 is a part that corrects inclination of the image data inputted by the image compounding section 1403 according to the vector information of the edge representing boundary between the rectangular shape document and region except the document inputted by the region managing section 1402; and outputs the corrected image data. Here, the image data outputted by the inclination correcting section 1404 is outputted to external equipment via the I/F section 307 (FIG. 2). Moreover, in the embodiment, it will be also explained the case that the edges representing boundary between the rectangular shape document and region except the document are drawn and are printed on a paper whose size is bigger than the document by the printing apparatus (FIG. 2).

Explain of the Operation

Figure 16:
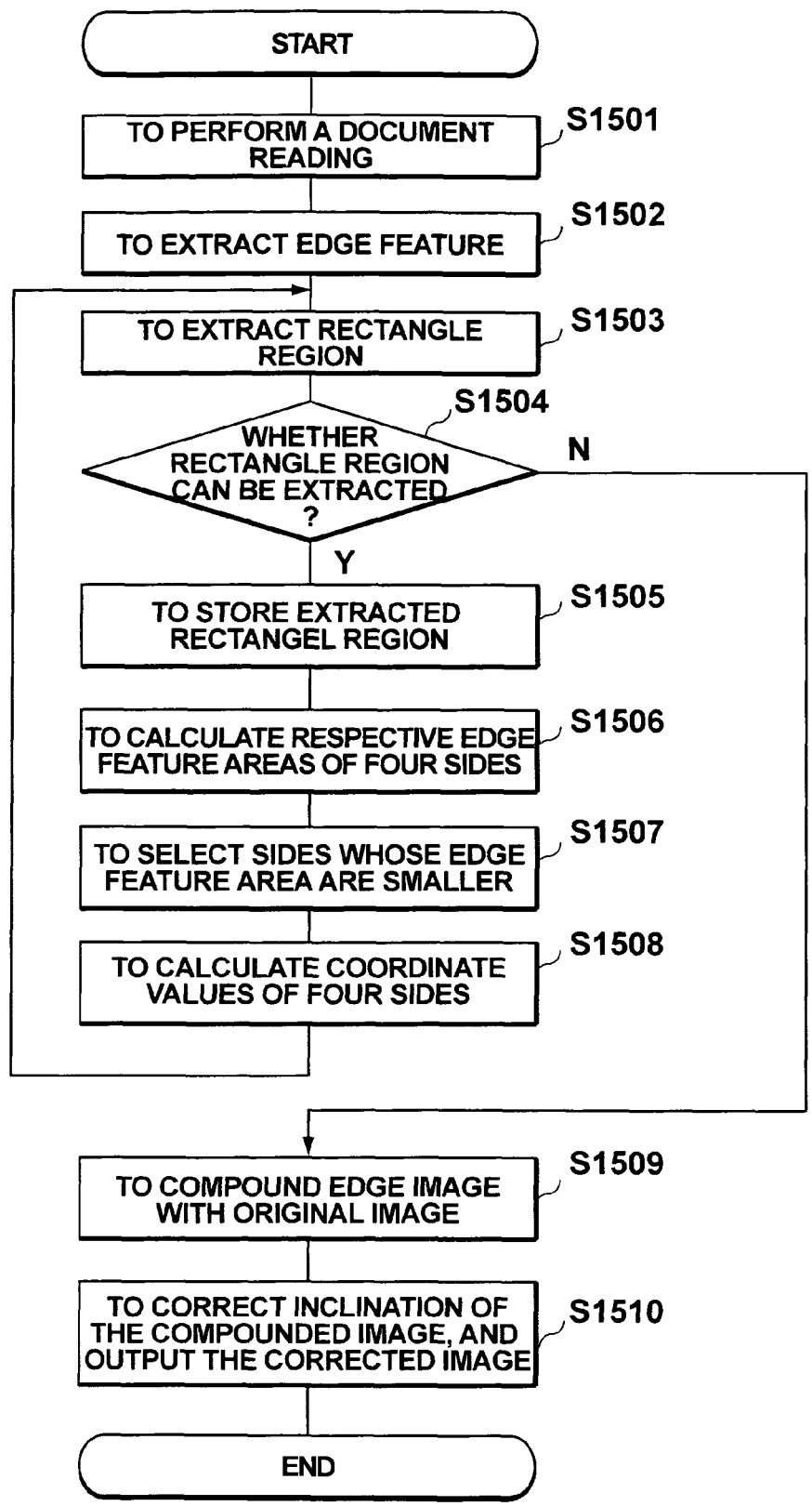
FIG. 16 is a flowchart for explaining the whole operation of an image reading apparatus in embodiment 2.

FIG. 16 is a flowchart for explaining the whole operation of an image reading apparatus in embodiment 2.

As an order of operation explain, first, the summary operation of the image reading apparatus will be explained, next, an important flow in the whole operation will be explained in detail. The whole operation of the image reading apparatus will be explained from step S1501 to step S1510 according to a step order by using the FIG. 15 and the FIG. 2 together with the FIG. 3.

Step S1501:

The image reading apparatus 1400 reads an area larger than the document by scanning through the image sensor 200; obtains image data; and stores it into the image data storing section 101.

Step S1502:

The edge feature extracting section 102 extracts edge feature from the image data stored in the image data storing section 101. Regarding details, because they are the same as the flowchart of FIG. 5 in embodiment 1, their explanations are omitted.

Step S1503:

The rectangle feature extracting section 103 extracts rectangle region after excluded edge features that are already detected according to the edge feature extracted by the edge feature extracting section 102 and a frame information managed by the region managing section 1402. Regarding details, because they are the same as the flowchart of FIG. 8 in embodiment 1, their explanations are omitted. Here, the frame information managed by the region managing section 1402 will be explained.

Figure 17:
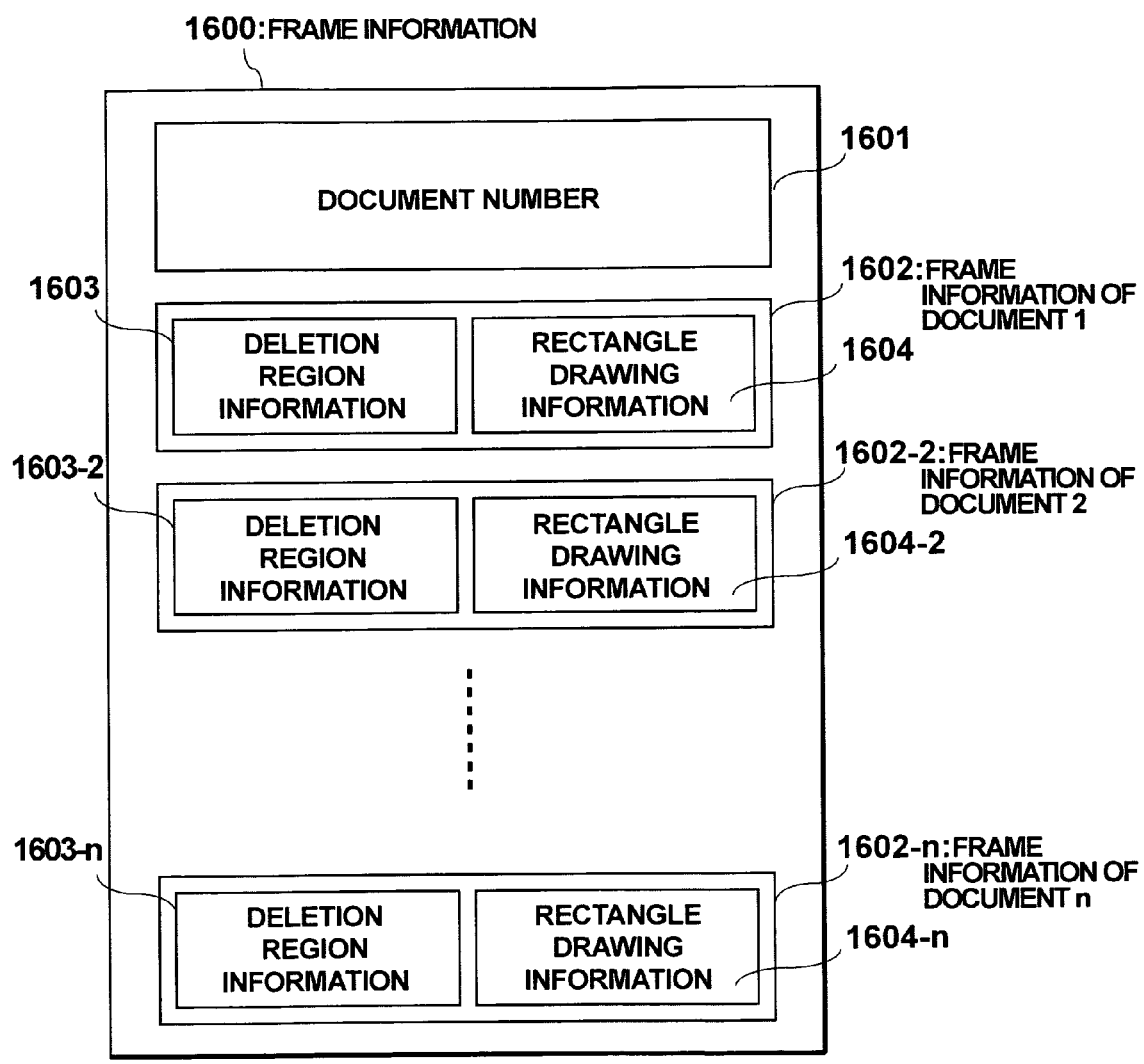
FIG. 17 is an explanatory diagram of frame information.

FIG. 17 is an explanatory diagram of frame information.

As shown by FIG. 17, the frame information 1600 which is stored and is managed by the region managing section 1402 consists of document number 1601 representing the number of the rectangle shape documents detected at this time and frame information 1602 of document N (N=1~n). Further, the frame information 1602 of document N (N=1~n) consists of a deletion region information 1603 and rectangle drawing information 1604. Here, the deletion region information 1603 represents rectangle region extracted in step S1505 described later. By using the deletion region information 1603, it is possible to prevent the same edge feature from using repeatedly on rectangle judgment. Further, the rectangle drawing information 1604 represents coordinate values and inclinations of frame calculated in step S1508 described later.

Step S1504:

In the step S1503, if the rectangle region can be extracted, step S1505 is started; if the rectangle region cannot be extracted, step S1509 is started.

Step S1505:

The rectangle feature extracting section 103 outputs the extracted rectangle region to the region managing section 1402. The region managing section 1402 stores the outputted rectangle region into the deletion region information 1603 (FIG. 17) of memory region representing the document number 1601 (FIG. 17).

Step S1506:

The unit feature area calculating section 104 calculates edge feature area of four sides from the rectangle region extracted in the step S1503. Regarding details, because they are the same as FIG. 11 in embodiment 1, their explanations are omitted.

Step S1507:

The region selecting section 105 combines two sides that are facing to and are paralleling each other so as to obtain two groups with respect to the four sides representing the rectangle; and respectively selects one side whose edge feature area is smaller from each group.

Step S1508:

The coordinates calculating section 106 generates rectangle shape as edge of the document from region information of the two sides selected by the region selecting section 105; and calculates coordinate values of the edge of the document. Regarding details, because they are the same as the flowchart of FIG. 13 in embodiment 1, their explanations are omitted. The region managing section 1402 stores the calculated coordinate values and inclinations into the rectangle drawing information 1604 of memory region representing the document number 1601; and returns to the step S1503. In the following, the operations from the step S1503 to the step S1508 are repeated, if the rectangle region cannot be extracted in the step S1504 (that is, in the case that information collection is finished regarding the all numbers 1~n of the document N), the step S1509 is started.

Step S1509:

The image compounding section 1403 paints out the rectangle region with a background color with respect to each document N (N=1~n) according to the deletion region information 1603 of the frame information 1600 (FIG. 17) managed by the region managing section 1402, from the original image data stored in the image data storing section 101; draws edge image with respect to each document N (N=1~n) according to the rectangle drawing information 1604; compounds the edge image with image data with respect to each document N (N=1~n); and outputs the compounded image to the inclination correcting section 1404. As the edge image, any kind of line may be used, for example, solid line, broken line and the like, further, the width of the line also may be set freely. Furthermore, it is possible to mark four corners of the document by using cross line and the like without drawing the edge.

Step S1510:

The inclination correcting section 1404 corrects the inclination of the image data inputted by the image compounding section 1403 with respect to each document according to the rectangle drawing information 1604 managed by the region managing section 1402 (FIG. 17); and outputs the corrected image data. Then, the flow is finished.

Explanation of the Effect

As explained above, in the embodiment, adding to the effect of the embodiment 1, in the case to read plural rectangle shape documents, even if each document has different inclination, edge representing boundary between the rectangular shape document and region except the document can be correctly obtained by correcting their respective inclinations.

The Utilization Possibility in Industry:

In the above stated explanation, only such case is explained that the present invention is applied to an image reading apparatus. However, the present invention also can be applied to facsimile, copying apparatus and digital multiplex apparatus.

The present invention is not limited to the foregoing embodiments but many modifications and variations are possible within the spirit and scope of the appended claims of the invention.

What is claimed is:

1. An image reading apparatus for reading to read an image of a document which has a rectangular shape, comprising:
 a storing section for storing image data obtained by reading an area larger than said document;
 a rectangular outline information extracting section for extracting rectangular outline information including four sides that correspond to four sides of the rectangular-shaped document according to the image data;
 a unit area calculating section for calculating respective unit areas per standardized length for each of said four sides in the rectangular outline information;
 a region selecting section for selecting outline information corresponding to two sides intersecting each other from said four sides of the rectangular outline information according to the calculated unit areas for each of the four sides; and
 a compounded-image outputting section for
  forming a rectangular outline image that corresponds to the four sides of the rectangular-shaped document based on the outline information of the selected two sides of the rectangular outline information,
  modifying said image data by removing a portion of the image data that corresponds to a rectangular outline region of the image data, and
  compounding the rectangular outline image with said modified image data, and outputting the compounded image.

2. The image reading apparatus according to claim 1, wherein the region selecting section determines respective inclination information of the two selected sides, the image reading apparatus further comprising:
 a coordinates calculating section for calculating coordinates to specify positions of straight lines representing said four sides of the rectangular document through using the respective inclination information of the two selected sides, and
 wherein said compounded-image outputting section forms the rectangular outline image by replacing, in the rectangular outline information, straight lines representing said four sides of the rectangular-shaped document with a frame image according to the calculated coordinates.

3. The image reading apparatus according to claim 2, wherein to select the two sides said region selecting section respectively selects one side whose edge feature area calculated by said unit feature area calculating section is smaller from each of two groups of the sides, each group including two sides that face each other.

4. The image reading apparatus according to claim 1, further comprising:
 a coordinates calculating section;
 a region managing section for managing frame information of a plurality of rectangular-shaped documents, and
 wherein for each one of the plurality of rectangular-shaped documents
  said rectangular outline information extracting section extracts rectangular outline information including four sides that correspond to four sides of the one rectangular-shaped document,
  the region selecting section selects outline information corresponding to two sides intersecting each other from said four sides of the rectangular outline information that corresponds to the one rectangular-shaped document, the outline information including respective inclination information of the two selected sides,
  the coordinates calculating section calculates coordinates to specify positions of straight lines representing said four sides of the one rectangular-shaped document through using the respective inclination information of the two selected sides, and
  the compounded-image outputting section replaces straight lines, in the rectangular outline information corresponding to the one rectangular-shaped document, representing said four sides of the one rectangular-shaped document with a frame image according to the calculated coordinates and outputs a compounded image based upon the frame image being compounded with the modified image.

5. The image reading apparatus according to claim 4, wherein:
 for each one of the plurality of rectangular-shaped documents the unit feature area calculating section calculates respective unit areas per standardized length for each of the four sides in the rectangular outline information corresponding to the one rectangular-shaped document, and
 wherein for each of the plurality of rectangular-shaped documents, to select the two sides said region selecting section respectively selects one side whose unit area is smaller from each of two groups of the sides, each group including two sides that face each other.

6. The image reading apparatus according to claim 1, wherein the compounded-image outputting section sets at least one of a line type and a line width of the outline image.

7. The image reading apparatus according to claim 1, wherein the compounded-image outputting section forms the outline image to include four cross lines.

8. The image reading apparatus according to claim 1, wherein the removed portion of the image data corresponds to an outer periphery of the document.

9. The image reading apparatus according to claim 8, wherein the removed portion of the image data further corresponds to a portion of said area that said document does not cover.

10. The image reading apparatus according to claim 1, wherein the region selecting section selects the two sides by selecting two sides that each have unit areas smaller than the unit area of one of the other two sides.

11. The image reading apparatus according to claim 1, further comprising:
   an outline information extracting section for extracting outline information of the document according to the image data,
   wherein the rectangular outline information extracting section extracts the rectangular outline information from the extracted outline information.

12. The image reading apparatus according to claim 11, wherein the outline information extracting section extracts the outline information by using a filter that highlights an outline of the image data.

13. The image reading apparatus according to claim 1, wherein the image data corresponds to a plurality of rectangular documents, wherein for each one of the plurality of rectangular documents
   said rectangular outline information extracting section extracts rectangular outline information that corresponds to the four sides of the one rectangular-shaped document,
   said unit area calculating section calculates respective unit areas per standardized length for each of said four sides in the rectangular outline information that corresponds to the one rectangular-shaped document,
   said region selecting section selects outline information corresponding to two sides intersecting each other from said rectangular outline information corresponding to the one rectangular-shaped document and based upon the calculated unit areas,
   the compounded-image outputting section replaces straight lines representing said four sides, in the rectangular outline information that corresponds to the one rectangular-shaped document, with a frame image according to the selected two sides,
   further wherein the compounded-image outputting section modifies said image data by removing a portion of the image data that corresponds to rectangular outline regions of the documents and outputs a compounded image based upon all of the frame images being compounded with the modified image data.

14. The image reading apparatus according to claim 1, wherein the compounded-image outputting section modifies an inclination of one of the sides of the rectangular outline information so as to correctly represent in the compounded image an inclination of the side of the rectangular document that corresponds to the one side of the rectangular outline information.

15. The image reading apparatus according to claim 1, wherein the unit area per standardized length for each of said four sides is determined by the formula:

$$K/H,$$

where H is the standardized length taken along a portion of the respective side, and
K is a total number of pixels within the portion.

16. The image reading apparatus according to claim 1, wherein the region selecting section selects outline information that only corresponds to said two sides intersecting each other from said four sides of the rectangular outline information according to the calculated unit areas for each side, and
   the compounded-image outputting section forms the rectangular outline image
      based upon the outline information that corresponds to the selected two sides,
      but not based upon outline information that corresponds to the two sides that are not selected by the region selecting section.

* * * * *